United States Patent
Villarreal-Chavez

(10) Patent No.: US 6,170,553 B1
(45) Date of Patent: Jan. 9, 2001

(54) VEHICLE WINDSHIELD SHADING APPARATUS

(76) Inventor: Tina Villarreal-Chavez, 520 Mocking Bird Hill Dr., Boron, CA (US) 93516

( * ) Notice: Under 35 U.S.C. 154(b), the term of this patent shall be extended for 0 days.

(21) Appl. No.: 09/407,238

(22) Filed: Sep. 28, 1999

(51) Int. Cl.[7] ............................................. B60J 3/00
(52) U.S. Cl. ................................. 160/370.22; 160/127
(58) Field of Search ........................ 160/370.22, 23.1, 160/127, 290.1; 296/97.7, 97.8

(56) References Cited

U.S. PATENT DOCUMENTS

| | | | |
|---|---|---|---|
| 4,258,004 | * | 3/1981 | Valenzona et al. ............... 239/59 X |
| 4,442,881 | * | 4/1984 | Monteath et al. .......... 160/370.22 X |
| 4,762,358 | * | 8/1988 | Levosky et al. ............ 160/370.22 X |
| 4,805,955 | * | 2/1989 | Levy ............................. 160/84.04 X |
| 4,814,212 | * | 3/1989 | Spector ............................. 239/57 X |
| 4,869,407 | * | 9/1989 | Booth et al. ....................... 239/327 X |
| 4,886,104 | | 12/1989 | Eldridge, Jr. ....................... 160/370.2 |
| 4,932,711 | | 6/1990 | Goebel ................................ 296/97.7 |
| 4,958,880 | | 9/1990 | Champane .......................... 296/97.7 |
| 5,098,149 | * | 3/1992 | Lee ............................. 160/370.22 X |
| 5,156,433 | | 10/1992 | Decker ............................... 296/97.7 |
| 5,282,571 | * | 2/1994 | Smith et al. ........................ 239/54 |
| 5,478,505 | * | 12/1995 | McElfresh et al. ................ 239/57 X |
| 5,813,450 | * | 9/1998 | Yang ............................... 160/370.23 |

* cited by examiner

Primary Examiner—David M. Purol
(74) Attorney, Agent, or Firm—Goldstein & Canino

(57) ABSTRACT

A vehicle windshield shading apparatus including an elongated rectangular housing securable to a roof of an interior of an automobile above a windshield thereon. A sheet of fabric is provided that is dimensioned for covering the windshield. The sheet of fabric has an upper end secured within the housing in a retracted orientation and extending across the windshield in an extended orientation. A ceramic fragrance strip is removably secured to a surface of the housing.

6 Claims, 2 Drawing Sheets

VEHICLE WINDSHIELD SHADING APPARATUS

BACKGROUND OF THE INVENTION

The present invention relates to a vehicle windshield shading apparatus and more particularly pertains to precluding sunlight to penetrate through a windshield when in an extended orientation.

Sunlight entering the windows of a vehicle, such as a parked car, will cause the air temperature within the car's interior to reach uncomfortably high levels, particularly when all of the windows of the car are shut. In addition, the steering wheel and seats may also be heated to a temperature which makes skin contact painful. Not only does this cause discomfort to the driver and the passengers upon returning to the car, these high temperatures and the solar radiation cause fading and cracking of surfaces within the cars interior, such as the dashboard. In order to avoid the discomfort described above, and to avoid the expense of replacing a sun damaged dashboard, it is desirable to provide a means to block the sun's rays from entering the car.

The present invention attempts to solve the abovementioned problems by providing a retractable shade that will cover a windshield of a vehicle when not in use and will be able to be stored within a housing above the windshield when not in use.

The use of window shades for automobiles is known in the prior art. More specifically, window shades for automobiles heretofore devised and utilized for the purpose of blocking sunlight are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,958,880 to Champane and U.S. Pat. No. 4,886,104 to Eldridge, Jr. disclose collapsible sun shields for use in windshields of cars. U.S. Pat. No. 4,932,711 to Goebel discloses a windshield shade that is attached to the dashboard of a car. U.S. Pat. No. 5,156,433 to Decker discloses a windshield screen that can be converted into a dashboard mat.

While these devices fulfill their respective, particular objective and requirements, the aforementioned patents do not describe a vehicle windshield shading apparatus for precluding sunlight to penetrate through a windshield when in an extended orientation.

In this respect, the vehicle windshield shading apparatus according to the present invention substantially departs from the conventional concepts and designs of the prior art, and in doing so provides an apparatus primarily developed for the purpose of precluding sunlight to penetrate through a windshield when in an extended orientation.

Therefore, it can be appreciated that there exists a continuing need for new and improved vehicle windshield shading apparatus which can be used for precluding sunlight to penetrate through a windshield when in an extended orientation. In this regard, the present invention substantially fulfills this need.

SUMMARY OF THE INVENTION

In the view of the foregoing disadvantages inherent in the known types of window shades for automobiles now present in the prior art, the present invention provides an improved vehicle windshield shading apparatus. As such, the general purpose of the present invention, which will be described subsequently in greater detail, is to provide a new and improved vehicle windshield shading apparatus and method which has all the advantages of the prior art and none of the disadvantages.

To attain this, the present invention essentially comprises an elongated rectangular housing securable to a roof of an interior of an automobile above a windshield thereon. The housing has a hollow interior with an elongated slotted opening through a bottom wall thereof. The hollow interior has a spool rotatably disposed therein. A sheet of fabric is provided that is dimensioned for covering the windshield. The sheet of fabric has an upper end secured to the spool of the housing. The sheet of fabric is wound about the spool in a retracted orientation and extends across the windshield in an extended orientation. A lower end of the sheet of fabric has a hook and loop strip disposed thereon. The hook and loop strip traverses an entire length of the lower end. A securement strip is secured to a dashboard of the automobile below the windshield thereon. The securement strip has a hook and loop strip thereon for mating with the hook and loop strip of the lower edge of the sheet of fabric for engaging the sheet of fabric in the extended orientation. A ceramic fragrance strip is removably secured to a surface of the housing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle windshield shading apparatus which has all the advantages of the prior art window shades for automobiles and none of the disadvantages.

It is another object of the present invention to provide a new and improved vehicle windshield shading apparatus which may be easily and efficiently manufactured and marketed.

It is a further object of the present invention to provide a new and improved vehicle windshield shading apparatus which is of durable and reliable construction.

An even further object of the present invention is to provide a new and improved vehicle windshield shading apparatus which is susceptible of a low cost of manufacture with regard to both materials and labor, and which accordingly is then susceptible of low prices of sale to the consuming public, thereby making such a vehicle windshield shading apparatus economically available to the buying public.

Even still another object of the present invention is to provide a new and improved vehicle windshield shading apparatus for precluding sunlight to penetrate through a windshield when in an extended orientation.

Lastly, it is an object of the present invention to provide a new and improved vehicle windshield shading apparatus including an elongated rectangular housing securable to a roof of an interior of an automobile above a windshield thereon. A sheet of fabric is provided that is dimensioned for covering the windshield. The sheet of fabric has an upper end secured within the housing in a retracted orientation and extending across the windshield in an extended orientation. A ceramic fragrance strip is removably secured to a surface of the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
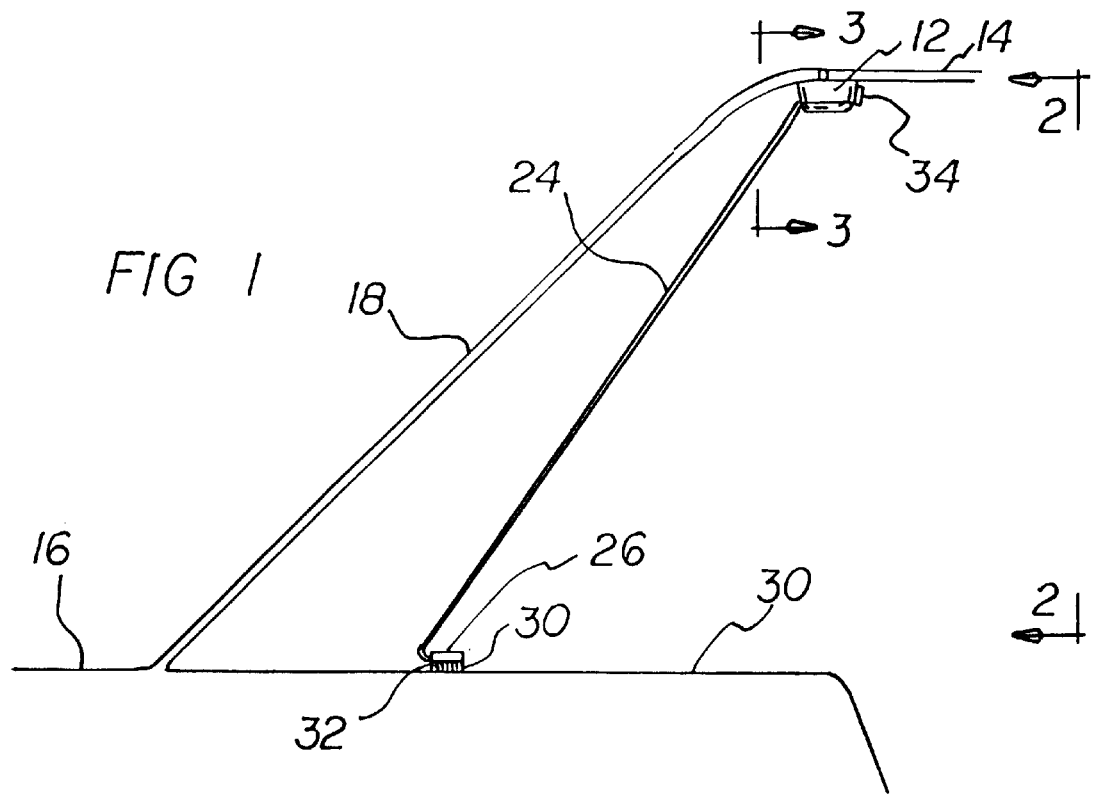
FIG. 1 is a perspective view of the preferred embodiment of the vehicle windshield shading apparatus constructed in accordance with the principles of the present invention.
Figure 2:
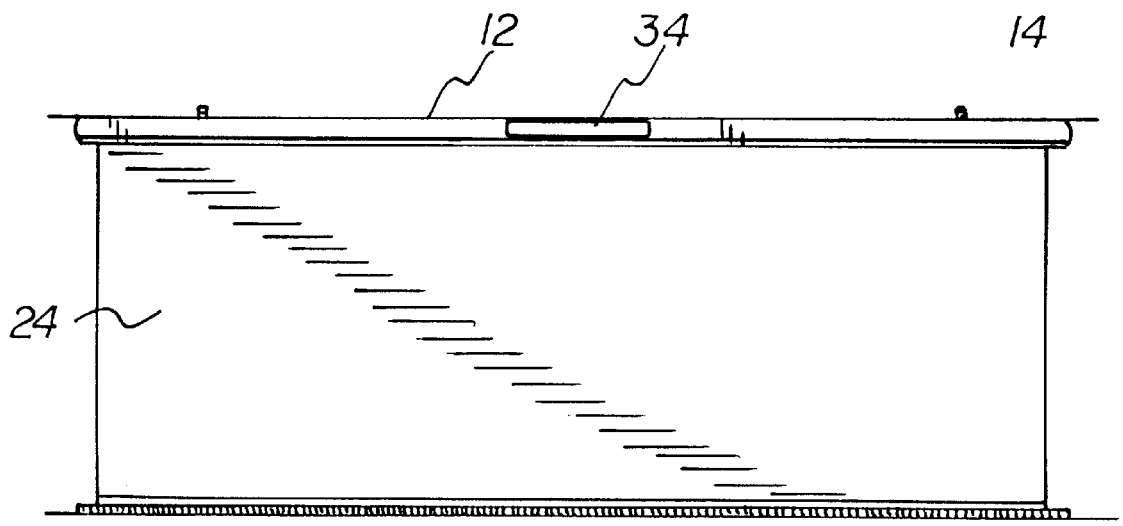
FIG. 2 is a front view of the present invention as taken along line 2—2 of FIG. 1.
Figure 3:
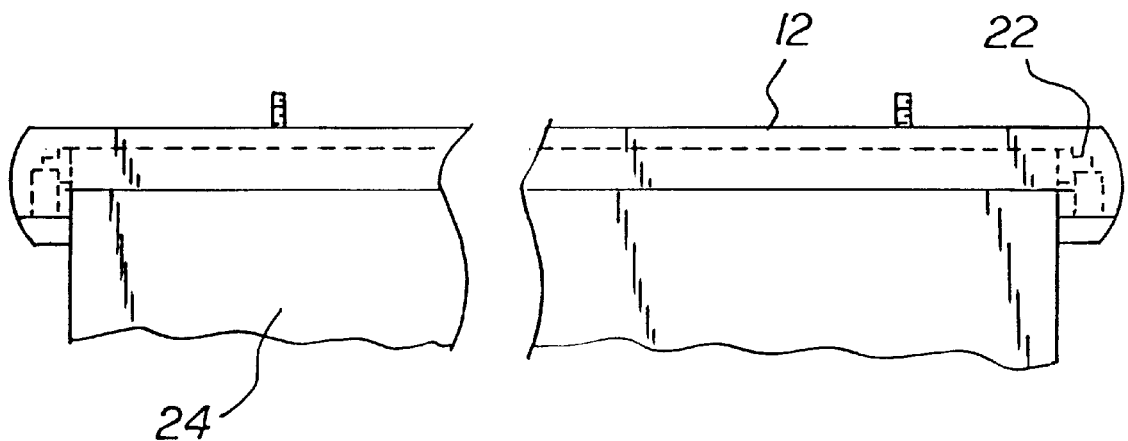
FIG. 3 is a cross-sectional view of the present invention as taken along line 3—3 of FIG. 1.
Figure 4:
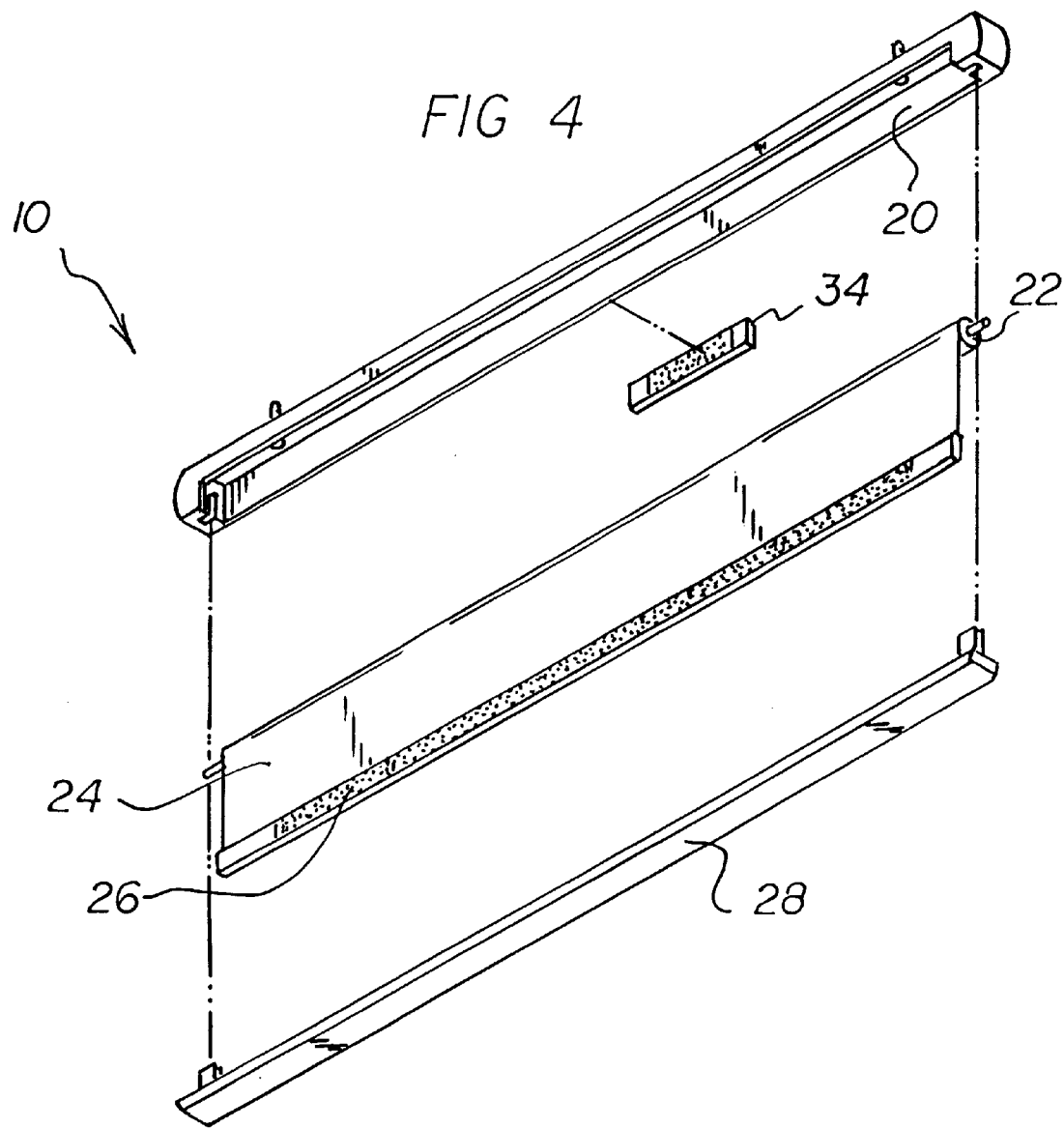
FIG. 4 is an exploded perspective view of the present invention.

With reference now to the drawings, and in particular, to FIGS. 1 through 4 thereof, the preferred embodiment of the new and improved vehicle windshield shading apparatus embodying the principles and concepts of the present invention and generally designated by the reference number 10 will be described.

Specifically, it will be noted in the various Figures that the device relates to a vehicle windshield shading apparatus for precluding sunlight to penetrate through a windshield when in an extended orientation. In its broadest context, the device consists of an elongated rectangular housing, a sheet of fabric, a securement strip, and a ceramic fragrance strip. Such components are individually configured and correlated with respect to each other so as to attain the desired objective.

The elongated rectangular housing 12 is securable to a roof 14 of an interior of an automobile 16 above a windshield 18 thereon. The housing 12 has a hollow interior with an elongated slotted opening 20 through a bottom wall thereof. The hollow interior has a spool 22 rotatably disposed therein. The housing 12 can be secured within the automobile using standard hardware or by using a strong glue or epoxy.

The sheet of fabric 24 is dimensioned for covering the windshield 18. The sheet of fabric 24 has an upper end secured to the spool 22 of the housing 12. The sheet of fabric 24 is wound about the spool 22 in a retracted orientation and extends across the windshield 18 in an extended orientation. A lower end of the sheet of fabric 24 has a hook and loop strip 26 disposed thereon. The hook and loop strip 26 traverses an entire length of the lower end.

The securement strip 28 is secured to a dashboard 30 of the automobile 16 below the windshield 18 thereon. The securement strip 28 has a hook and loop strip 32 thereon for mating with the hook and loop strip 26 of the lower edge of the sheet of fabric 24 for engaging the sheet of fabric 24 in the extended orientation.

The ceramic fragrance strip 34 is removably secured to a surface of the housing 12. The fragrance strip 34 can be removed and replaced when needed.

In use, the housing 12 is secured to the roof of the automobile and the securement strip 28 is secured to the dashboard 30 of the automobile 16. Thus, when the driver of the automobile 16 is prepared to exit, they simply pull downwardly on the lower edge of the sheet of fabric 24 until it is fully extended whereupon they may secure the lower edge to the securement strip 28 by mating the hook and loop fasteners.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A vehicle windshield shading apparatus for precluding sunlight to penetrate through a windshield when in an extended orientation comprising, in combination:

an elongated rectangular housing securable to a roof of an interior of an automobile above a windshield thereon, the housing having a hollow interior with an elongated slotted opening through a bottom wall thereof, the hollow interior having a spool rotatably disposed therein;

a sheet of fabric dimensioned for covering the entire windshield, the sheet of fabric having an upper end secured to the spool of the housing, the sheet of fabric being wound about the spool in a retracted orientation and extending across the windshield in an extended orientation, a lower end of the sheet of fabric having a hook and loop strip disposed thereon, the hook and loop strip traversing an entire length of the lower end;

a securement strip secured to a dashboard of the automobile below the windshield thereon, the securement strip having a hook and loop strip thereon for mating with the hook and loop strip of the lower edge of the sheet of fabric for engaging the sheet of fabric in the extended orientation;

a ceramic fragrance strip removably secured to a surface of the housing.

2. A vehicle windshield shading apparatus for precluding sunlight to penetrate through a windshield when in an extended orientation comprising, in combination:

an elongated rectangular housing securable to a roof of an interior of an automobile above a windshield thereon;

a sheet of fabric dimensioned for covering the windshield, the sheet of fabric having an upper end secured within the housing in a retracted orientation and extending across the windshield in an extended orientation;

a ceramic fragrance strip removably secured to a surface of the housing.

3. The vehicle windshield shading apparatus as set forth in claim 2 wherein the housing has a hollow interior with an elongated slotted opening through a bottom wall thereof for allowing the sheet of fabric to pass therethrough.

4. The vehicle windshield shading apparatus as set forth in claim 3 wherein the hollow interior has a spool rotatably disposed therein for coupling with the sheet of fabric.

5. The vehicle windshield shading apparatus as set forth in claim 4 wherein a lower end of the sheet of fabric having a hook and loop strip disposed thereon, a securement strip is secured to a dashboard of the automobile below the windshield thereon, the securement strip having a hook and loop strip thereon for mating with the hook and loop strip of the lower edge of the sheet of fabric for engaging the sheet of fabric in the extended orientation.

6. The vehicle windshield shading apparatus as set forth in claim 5 wherein the hook and loop strip traverses an entire length of the lower end of the sheet of fabric.

* * * * *